United States Patent
Miyamori et al.

(10) Patent No.: US 11,945,927 B2
(45) Date of Patent: Apr. 2, 2024

(54) FOAM AND METHOD FOR PRODUCING SAME

(71) Applicant: SEIKO PMC CORPORATION, Tokyo (JP)

(72) Inventors: Ryo Miyamori, Chiba (JP); Daisuke Kuroki, Chiba (JP); Hideya Sekiguchi, Chiba (JP); Akihiro Sato, Chiba (JP)

(73) Assignee: SEIKO PMC CORPORATION, Tokyo (JP)

( * ) Notice: Subject to any disclaimer, the term of this patent is extended or adjusted under 35 U.S.C. 154(b) by 267 days.

(21) Appl. No.: 17/254,916

(22) PCT Filed: Feb. 26, 2020

(86) PCT No.: PCT/JP2020/007660
§ 371 (c)(1),
(2) Date: Dec. 22, 2020

(87) PCT Pub. No.: WO2020/202909
PCT Pub. Date: Oct. 8, 2020

(65) Prior Publication Data
US 2022/0025142 A1    Jan. 27, 2022

(30) Foreign Application Priority Data

Apr. 5, 2019   (JP) ................. 2019-072779

(51) Int. Cl.
| | |
|---|---|
| *C08J 3/22* | (2006.01) |
| *C08J 5/04* | (2006.01) |
| *C08J 5/06* | (2006.01) |
| *C08J 9/00* | (2006.01) |
| *C08J 9/10* | (2006.01) |

(52) U.S. Cl.
CPC ............. *C08J 9/0085* (2013.01); *C08J 3/226* (2013.01); *C08J 9/0061* (2013.01); *C08J 9/103* (2013.01); *C08J 2201/026* (2013.01); *C08J 2315/00* (2013.01); *C08J 2323/06* (2013.01); *C08J 2323/16* (2013.01)

(58) Field of Classification Search
None
See application file for complete search history.

(56) References Cited

U.S. PATENT DOCUMENTS

| | | | |
|---|---|---|---|
| 2015/0094385 A1* | 4/2015 | Achiha | C08L 23/16 521/95 |
| 2018/0162960 A1 | 6/2018 | Miyamori et al. | |
| 2018/0346708 A1 | 12/2018 | Murillo et al. | |
| 2019/0218357 A1 | 7/2019 | Yamada et al. | |

FOREIGN PATENT DOCUMENTS

| | | | |
|---|---|---|---|
| JP | 2006160945 A | * | 6/2006 |
| JP | 2013-185085 A | | 9/2013 |
| JP | 2016-191007 A | | 11/2016 |
| JP | 6394934 B1 | | 9/2018 |
| WO | 2016/208634 A1 | | 12/2016 |
| WO | 2017/089222 A1 | | 6/2017 |
| WO | 2018/110566 A1 | | 6/2018 |

OTHER PUBLICATIONS

Machine translation for JP-2006160945-A obtained from Clarivate Analytics in Aug. 2023 (Year: 2023).*
International Search Report (ISR) dated May 19, 2020 filed in PCT/JP2020/007660.

* cited by examiner

*Primary Examiner* — Melissa A Rioja
(74) *Attorney, Agent, or Firm* — RANKIN, HILL & CLARK LLP

(57) ABSTRACT

[Problem] An object of the present invention is to provide a foam including a thermoplastic resin and rubber as a main component, in which a micronized product of a cellulose fiber is uniformly dispersed, and uniformity and mechanical properties are excellent. [Solution] A foam includes a modified cellulose fiber (A) covalently bonded with a diene-based polymer, a thermoplastic resin and/or rubber (B), and a diene-based polymer (C) having a functional group capable of covalently bonding with a cellulose fiber, in which the fiber (A) is micronized, the fiber (A) has a content of 0.05 to 20% by mass, and the thermoplastic resin and/or rubber (B) has a glass transition point of −130° C. to 120° C.

7 Claims, 1 Drawing Sheet

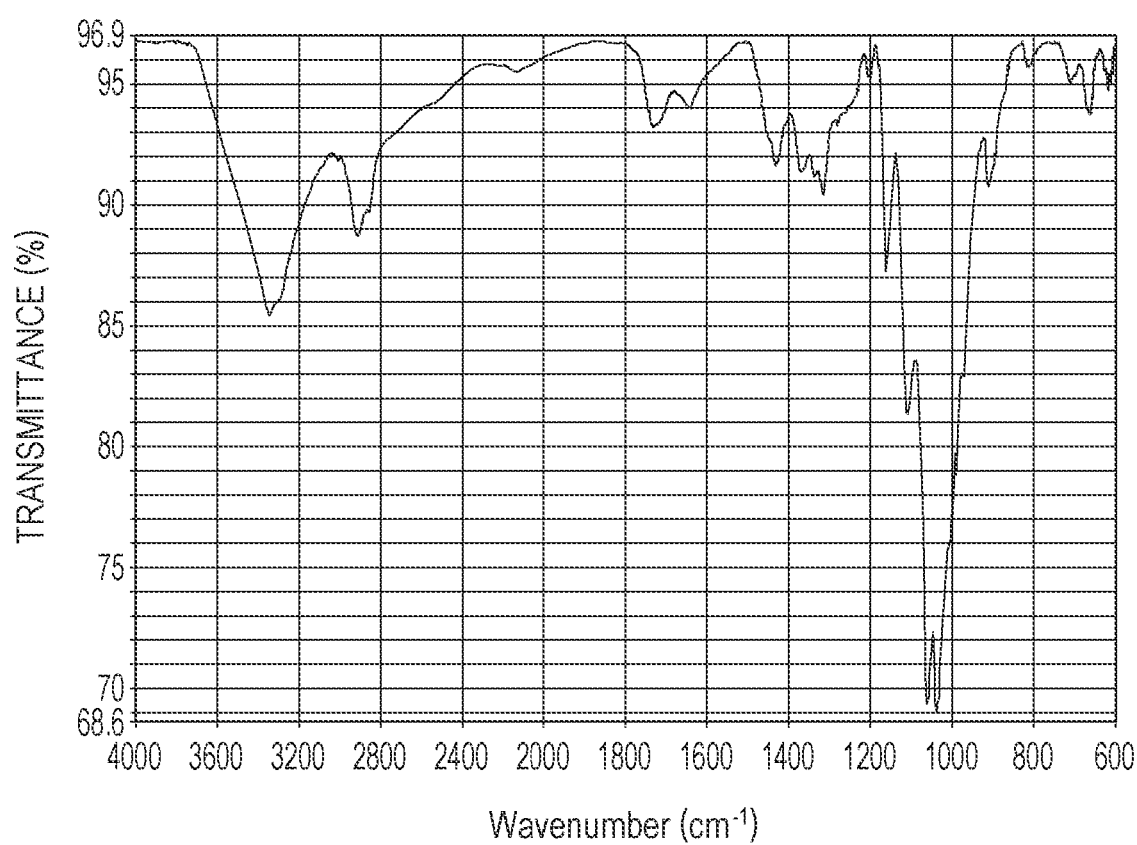

FOAM AND METHOD FOR PRODUCING SAME

TECHNICAL FIELD

The present invention relates to a foam and a production method thereof.

BACKGROUND ART

Thermoplastic resins and rubber, which are inexpensive and excellent in flexibility and chemical resistance, are widely used for applications such as sporting goods, hoses, packing materials, rolls, belts, tires, components for electronic equipment or automobiles, and medical products. Furthermore, since thermoplastic resins and rubber provides properties such as weight reduction, heat insulation, sound insulation, insulation, and impact absorption, a foam obtained by foaming resins or rubber has been known. A foam is lighter than when it is in a solid state on the basis of an identical volume and is excellent in the above-described properties. However, there is a problem in that foaming causes mechanical properties to become lower than when it is in a solid state. Therefore, there are desires for a foam which is lighter in weight and also has high mechanical properties.

Since cellulose fibers are excellent in thermal recycling, development of a technology to use cellulose fibers as a reinforcing material of a foam is under study. However, cellulose fibers, which are hydrophilic, are low in dispersibility in thermoplastic resins or rubber, which are hydrophobic. Therefore, added cellulose fibers sometimes aggregate inside thermoplastic resins or rubber, and reinforcing effects are not expressed. Rather, mechanical properties are sometimes deteriorated.

In Patent Literature 1, cellulose nanofibers are added to a rubber-based crosslinked foam molded body in order to improve shape stability, abrasion resistance, and mechanical strength. However, effects of improving mechanical properties of rubber by cellulose nanofibers were not sufficient.

Also, Patent Literature 2 discloses a foam containing microfibrillated plant fibers esterified with alkyl or alkenyl succinic anhydrides. In addition, Patent Literature 3 describes that an acid anhydride reacts with a cellulose fiber to obtain carboxyl group-containing cellulose, and the obtained carboxyl group-containing cellulose further reacts with a glycidyl group-containing compound to obtain a modified cellulose fiber to be used for reinforcing a foam. Although a foam having more excellent mechanical properties could be obtained by the methods according to Patent Literatures 2 and 3, there have been desires for further improvement.

CITATION LIST

Patent Literature

Patent Literature 1: JP-A-2016-191007
Patent Literature 2: JP-A-2013-185085
Patent Literature 3: Japanese Patent No. 6394934

SUMMARY OF THE INVENTION

Problems to be Solved by the Invention

An object of the present invention is to provide a foam that includes a cellulose fiber and a thermoplastic resin and/or rubber and that is uniform and excellent in mechanical properties.

Solutions to the Problems

The present inventors intensively conducted research for solving the above-described problems. As a result, it was found that a micronized cellulose fiber covalently bonded with a diene-based polymer can achieve a foam that includes a thermoplastic resin and/or rubber and that is uniform and excellent in mechanical properties. Thus, the present invention has been accomplished.

That is, the present invention is as follows. (1) A foam including a modified cellulose fiber (A) covalently bonded with a diene-based polymer, a thermoplastic resin and/or rubber (B), and a diene-based polymer (C) having a functional group capable of covalently bonding with a cellulose fiber, in which the fiber (A) is micronized, the fiber (A) has a content of 0.05 to 20% by mass, and the thermoplastic resin and/or rubber (B) has a glass transition point of $-130°$ C. to $120°$ C.

(2) The foam according to the above-described (1), in which the thermoplastic resin and/or rubber (B) is crosslinked.

(3) The foam according to the above-described (1), in which the mass ratio is (A)/(B)/(C)=1/1.5 to 2000/0.001 to 0.5.

(4) A production method of a foam, including the following steps: (step 1) a step of adjusting a concentration by diluting a masterbatch containing a micronized modified cellulose fiber (A) covalently bonded with a diene-based polymer, a thermoplastic resin and/or rubber (B) having a glass transition point of $-130°$ C. to $120°$ C., and a diene-based polymer (C) having a functional group capable of covalently bonding with a cellulose fiber, with the above-described (B); (step 2) a step of adding a foaming agent and, as necessary, a crosslinking agent after (step 1); and (step 3) a step of performing foam molding or crosslinking and foam molding after (step 2).

(5) The production method of a foam according to the above-described (4), in which the fiber (A) has a content of 0.05 to 20% by mass, and the foaming agent is thermally-decomposable.

Effects of the Invention

According to the present invention, there can be obtained the foam that is uniform and excellent in mechanical properties, in which the micronized product of the modified cellulose fiber (A) covalently bonded to a diene-based polymer is uniformly dispersed in the thermoplastic resin and/or rubber (B).

DESCRIPTION OF THE EMBODIMENTS

A foam according to the present invention includes at least a modified cellulose fiber (A) covalently bonded with a diene-based polymer, a thermoplastic resin and/or rubber (B), and a diene-based polymer (C) having a functional group capable of covalently bonding with a cellulose fiber (hereinafter, sometimes abbreviated as a component (A), a component (B), and a component (C) respectively).

BRIEF DESCRIPTION OF THE DRAWINGS

FIG. 1 is an IR chart of a modified cellulose fiber obtained by causing a cellulose fiber to react with Ricon (registered trademark (hereinafter, sometimes abbreviated)) 130MA8 (manufactured by Cray Valley Co., maleic anhydride-modified polybutadiene) for esterification.

COMPONENT (A)

The component (A) is not particularly limited, as long as it is a cellulose fiber covalently bonded with a diene-based polymer. The structure of a covalent bond may be optional.

A method for obtaining a modified cellulose fiber (A) covalently bonded with a diene-based polymer is not particularly limited. However, in consideration of the effects of the invention, the modified cellulose fiber (A) can be obtained by, for example, causing 100 parts by mass of a cellulose fiber to react with a diene-based polymer (a) having a functional group capable of covalently bonding with a cellulose fiber in an amount of 1 to 100 parts by mass, preferably 5 to 86 parts by mass, further preferably 7 to 70 parts by mass, and most preferably 8 to 60 parts by mass (hereinafter, a diene-based polymer (a) having a functional group capable of covalently bonding with a cellulose fiber is sometimes abbreviated as a "diene-based polymer (a)").

The cellulose fiber is not particularly limited, as long as it contains cellulose. The generation origin of cellulose is not particularly limited. Examples thereof include plant-originated fibers contained in wood, bamboo, hemp, jute, kenaf, cotton, and beet, mercerized cellulose fibers, regenerated cellulose fibers such as rayon and lyocell, and cellulose fibers produced by living organisms such as microorganisms and ascidians.

Among these, wood is preferable. Examples thereof include Sitka spruce, cedar, cypresses, pine, eucalyptus, and acacia. In addition, a defibrated product of paper and waste paper obtained with these fibers as a raw material is also suitably used as cellulose fiber. Other examples include modified products of these fibers with acid anhydrides, isocyanate compounds, epoxy compounds, silane compounds, acid halides, and the like. These cellulose fibers can be used individually or in combination of two or more.

Pulp, which is one of the cellulose fibers obtained from plant-originated fibers, can be obtained by pulping cellulose fibers chemically, mechanically, or both chemically and mechanically. Examples thereof include chemical pulp (unbleached kraft pulp (UKP), bleached kraft pulp (BKP), and sulfite pulp (SP)), semichemical pulp (SCP), chemiground pulp (CGP), chemimechanical pulp (CMP), ground pulp (GP), refiner mechanical pulp (RMP), thermomechanical pulp (TMP), and chemithermomechanical pulp (CTMP). Among these pulps, unbleached kraft pulp (NUKP) or bleached kraft pulp (NBKP) originated from needle-leaved trees having high fiber strength is particularly preferable.

Diene-Based Polymer (a)

The diene-based polymer (a) having a functional group capable of covalently bonding with a cellulose fiber is not particularly limited, as long as it is a diene-based polymer having a functional group capable of covalently bonding with a cellulose fiber. The type of the functional group capable of covalently bonding with a cellulose fiber is not particularly limited, as long as it can covalently bond with a cellulose fiber. Examples thereof include an aldehyde group, an epoxy group, an isocyanate group, a carboxy group, an alkoxysilyl group, an acid anhydrous group, and an acid halide group. These functional groups may be included individually or in combination of two or more, and another functional group may be included. From the viewpoint of reactivity and safety, an acid anhydrous group is preferable.

Specific examples of the diene-based polymer include polyisoprene, polybutadiene, styrene-butadiene copolymers, polychloroprene, acrylonitrile-butadiene copolymers, (meth)acrylic acid (ester)-butadiene copolymers, isobutene-isoprene copolymers, vinylpyridine-butadiene copolymers, and vinylpyridine-styrene-butadiene copolymers. Further examples of the diene-based polymer include these polymers in combination with another monomer. These can be used individually or in combination of two or more. Polyisoprene and polybutadiene are preferable, and polybutadiene is more preferable. The polymerization method of the diene-based polymer is not particularly limited. A vinyl group may exist on the side chain as a result of the inclusion of a 1,2-added component as well as a 1,4-added component during the polymerization of a diene monomer.

The component (A) needs to be micronized in a finally obtained foam. The timing and method for micronization will be described later. If the component (A) is not micronized, coarse fibers cause breakage and coalescence of inside bubbles during a foaming process, which leads to the generation of coarse bubbles. Consequently, a uniform foam cannot be obtained, and the mechanical properties of a foam are deteriorated. Furthermore, coarse fibers themselves, as a drawback inside a foam, sometimes deteriorate the mechanical properties of a foam, similarly to the fiber aggregate.

In the present invention, micronization, which represents an aspect of the component (A), indicates that the fiber diameter of the component (A) is 5 μm to 2 nm, preferably 2 μm to 4 nm, more preferably 1.8 μm to 10 nm, and further preferably 1.6 μm to 15 nm. The fiber diameter can be measured by washing away a resin component and/or a rubber component in a foam with a solvent in which the component can dissolve, and thereafter observing a fiber content contained in the residue through a scanning electron microscope. In the present invention, the fiber diameter is measured by wrapping a foam sample containing the component (A) in a 325 mesh stainless mesh, treating the sample under reflux of xylene at 140° C. for 5 hours such that resin dissolves, and observing an extracted and dried fiber content through a scanning electron microscope (manufactured by JEOL Ltd., JSM-5610LV).

COMPONENT (B)

The thermoplastic resin and/or rubber is not particularly limited, as long as it is a thermoplastic resin, a thermoplastic resin and rubber, or rubber. From the viewpoint of molding properties, the thermoplastic resin and/or rubber needs to have a glass transition point of −130° C. to 120° C. The glass transition point is preferably −130° C. to 100° C., more preferably −130° C. to 50° C., and further preferably −130° C. to 0° C.

Examples of the thermoplastic resin include one or a combination of two or more selected from various polyolefins such as polyethylene, polypropylene, and α-olefin-ethylene copolymers; various polyamides such as polyamide 11 and polyamide 12; various polyesters such as polybutylene succinate, poly(3-hydroxybutyrate-co-3-hydroxyhexanoate), and polylactic acid; various poly(meth)acryls such as polymethyl methacrylate and polyethyl methacrylate; various polyethers such as polyoxymethylene; various polycarbonates such as polypropylene carbonate and polycarbonate diol; and polystyrene, petroleum resin, coumarone resin, terpene resin, rosin resin, polyvinyl alcohol, polyvinyl acetate, ethylene-vinyl acetate copolymers, styrene-based elastomers, ethylene-vinyl alcohol copolymers, various polyurethanes, polyvinyl chloride, and modified products thereof.

Among these, styrene-based elastomers, polyolefin, polystyrene, ethylene-vinyl acetate copolymers, and modified products thereof are preferable, and polyolefin and a modified product thereof are more preferable.

Examples of polyolefin include one or a combination of two or more selected from polyethylene, polypropylene, ethylene-propylene copolymers, ethylene-butene copolymers, ethylene-hexene copolymers, ethylene-octene copolymers, and modified products thereof.

Examples of rubber include one or a combination of two or more selected from acryl rubber, polyisobutylene, ethylene-butene-diene copolymers, ethylene-hexene-diene copolymers, ethylene-octene-diene copolymers, acrylonitrile-butadiene-styrene copolymers, rubber containing a diene compound in raw material monomers, epichlorhydrin rubber, polysulfide rubber, silicone rubber, fluorine rubber, polynorbornene, and modified products thereof.

Among these, rubber containing a diene compound in raw material monomers and a modified product thereof are preferable, and rubber containing a diene compound in raw material monomers and a modified product thereof are more preferable.

Examples of the rubber containing a diene compound in raw material monomers include one or a combination of two or more selected from natural rubber, synthetic polyisoprene, polychloroprene, polybutadiene, styrene-butadiene copolymers, styrene-isoprene copolymers, isobutylene-isoprene copolymers, styrene-isoprene-butadiene copolymers, acrylonitrile-butadiene copolymers, ethylene-propylene-diene copolymers, isobutylene-isoprene copolymers, and modified products thereof. Especially, ethylene-propylene-diene copolymers are preferable.

COMPONENT (C)

The component (C) is not particularly limited, as long as it is a diene-based polymer having a functional group capable of covalently bonding with a cellulose fiber. The type of the functional group capable of covalently bonding with a cellulose fiber is not particularly limited, as long as it can covalently bond with a cellulose fiber. Examples thereof include an aldehyde group, an epoxy group, an isocyanate group, a carboxy group, an alkoxysilyl group, an acid anhydrous group, and an acid halide group. These functional groups may be included individually or in combination of two or more, and another functional group may be included. From the viewpoint of reactivity and safety, an acid anhydrous group is preferable.

Specific examples of the diene-based polymer include polyisoprene, polybutadiene, styrene-butadiene copolymers, polychloroprene, acrylonitrile-butadiene copolymers, (meth)acrylic acid (ester)-butadiene copolymers, isobutene-isoprene copolymers, vinylpyridine-butadiene copolymers, and vinylpyridine-styrene-butadiene copolymers. Further examples of the diene-based polymer include these polymers in combination with another monomer. These can be used individually or in combination of two or more. Polyisoprene and polybutadiene are preferable, and polybutadiene is more preferable. The polymerization method of the diene-based polymer is not particularly limited. A vinyl group may exist on the side chain as a result of the inclusion of a 1,2-added component as well as a 1,4-added component during the polymerization of a diene monomer.

The component (C) is preferably the same as the diene-based polymer (a). Also, when the cellulose fiber and the diene-based polymer (a) to bond with the cellulose fiber react to obtain the component (A), the diene-based polymer (a) to bond with the cellulose fiber can previously remain as an unreacted component in the component (A) so as to be dispersed in the component (B), as the component (A) containing the component (C).

The foam according to the present invention needs to include the component (A) in an amount of 0.05 to 20% by mass, more preferably 0.1 to 18% by mass, further preferably 0.15 to 15% by mass, and most preferably 0.2 to 12 mass. When the content of the component (A) is less than 0.05% by mass, sufficient reinforcing effects cannot be obtained. When more than 20% by mass, a uniform foam cannot be obtained.

The foam obtained in the present invention is preferably crosslinked. The crosslinking method will be described later. Since the component (A) used in the present invention is covalently bonded with the diene-based polymer, an unsaturated bond and/or hydrogen in the allyl position, which contributes to a crosslinking reaction, exists. Therefore, the component (A) bonds with the component (B) during a crosslinking reaction, with the result that excellent reinforcing effects to the crosslinked foam is expressed. Since a diene-based polymer structure is high in molecular motivity and also contains a large amount of an unsaturated bond and/or hydrogen in the allyl position at high density, the component (A) bonds with the component (B) more efficiently than a non-diene-based polymer structure.

From the viewpoint of molding properties and mechanical properties, the foam according to the present invention preferably includes the components (A) to (C) at a mass ratio of component (A)/component (B)/component (C)=1/1.5 to 2000/0.001 to 0.5, more preferably ¼ to 1000/0.005 to 0.25, and particularly preferably ⅕.5 to 915/0.01 to 0.15.

For producing the foam according to the present invention, a foaming agent or the like is preferably used. The type of the foaming agent used for obtaining the foam according to the present invention is not particularly limited. Specifically, physical foaming agents and thermally-decomposable foaming agents are used individually or in combination of two or more. Examples of the physical foaming agent include nitrogen, carbon dioxide, Freon gas, and low-molecular hydrocarbon. On the other hand, examples of the thermally-decomposable foaming agent include nitroso compounds, azo compounds, sulfonyl hydrazide compounds, azide compounds, and inorganic foaming agents. Examples of the inorganic foaming agent include sodium hydrogen carbonate, sodium carbonate, ammonium hydrogen carbonate, ammonium carbonate, and ammonium nitrite. A thermally-decomposable foaming agent is more preferable, azo compounds are further preferable, and azodicarbonamide is particularly preferable.

The foam according to the present invention is preferably a crosslinked body. The crosslinking method is not particularly limited. Specifically, it is one or more selected from peroxide crosslinking, sulfur crosslinking by sulfur and/or sulfur donors, amine crosslinking, phenolic resin crosslinking, electron beam crosslinking, UV light crosslinking, ion crosslinking, polyol crosslinking, oxim crosslinking, quinoid crosslinking, bismaleimide crosslinking, epoxy crosslinking, and polyvalent isocyanate crosslinking, and more preferably one or a combination of two or more selected from peroxide crosslinking and sulfur crosslinking. Also, a crosslinking agent may be used in combination during crosslinking.

The type of the peroxide, sulfur, and sulfur donors used for obtaining a crosslinked body in the present invention is not particularly limited. One type or a combination of two or more types may be used. It is preferably t-butyl peroxypivalate, dilauroyl peroxide, 1,1,3,3-tetramethylbutylperoxy-2-ethylhexanate, t-butylperoxy-2-ethylhexanate, dibenzoyl peroxide, t-butyl peroxylaurate, dicumyl peroxide, di-t-hexyl peroxide, sulfur, dithiodimorpholine, dithiodicaprolactam, alkylphenol disulfide, macromorecular polysulfide, thiuram polysulfides, and dithiobenzothiazoles, and more preferably dicumyl peroxide, sulfur, and thiuram polysulfides.

Other additives can be used before and after the production of the foam according to the present invention. Examples of other additives include a stabilizer, a foaming aid, an inorganic filler, a pigment, and a compatibilizer.

The production of the foam according to the present invention may include using a stabilizer. The type of the stabilizer is not particularly limited, as long as it has the function of suppressing quality deterioration during the storage and/or the processing of the component (A). One type or a combination of two or more types can be used. Examples of the stabilizer include an antioxidant, a metal deactivator, an UV absorber, a quencher, a photostabilizer, a flame retardant, and an antistatic agent.

Specific examples of the foaming aid include urea and zinc compounds. From the viewpoint of improving a foaming rate, zinc compounds are preferably added.

Examples of the compatibilizer include maleic anhydrides, maleic anhydride-modified polyethylene, maleic anhydride-modified polypropylene, epoxy group-containing resins, polyethylene glycol, polypropylene glycol, ethylene glycol-propylene glycol copolymers, polybutylene glycol, and stearic acid amide.

The production method of the foam according to the present invention preferably includes the following steps.
(Step 1)
A step of adjusting a concentration by diluting a masterbatch containing a micronized modified cellulose fiber (A) covalently bonded with a diene-based polymer, a thermoplastic resin and/or rubber (B) having a glass transition point of −130° C. to 120° C., and a diene-based polymer (C) having a functional group capable of covalently bonding with a cellulose fiber, with the (B).
In this step, melt-kneading is preferable in the preparation and dilution of the masterbatch.
(Step 2)
A step of adding a foaming agent and, as necessary, a crosslinking agent after (Step 1).
(Step 3)
A step of performing foam molding or crosslinking and foam molding after (Step 2).

Melt-kneading is an operation of kneading a molten polymer together with another type of polymer or a solid filler and can be performed at not lower than the melting point of the polymer.

In (Step 1), the masterbatch having a component (A) concentration that is higher than that of the foam is used, compared to when the components (A) to (C) are mixed in one step to be used for molding a foam. Accordingly, when further diluted with the component (B), the micronized component (A) can also be efficiently and uniformly dispersed in the component (B).

The micronized component (A) used in (Step 1) may be obtained either by causing a previously micronized cellulose fiber to react with a diene-based polymer (a) to bond with a cellulose fiber when preparing the component (A) or by micronizing the component (A) after it has been prepared. The micronization method of a cellulose fiber may be any known defibrating method. For example, micronization can be performed by defibrating a cellulose fiber-containing material or an aqueous suspension or slurry thereof through mechanical grinding or beating with a refiner, a high-pressure homogenizer, a grinder, a uniaxial or multiaxial (for example, biaxial) kneader, a bead mill, or the like.

In the present invention, it is possible to use a masterbatch obtained by kneading the previously micronized component (A) together with the component (B) and the component (C) in (Step 1). However, since previously micronizing the component (A) causes the step to be complicated, it is preferable to use a masterbatch obtained by performing micronization while kneading the component (A) and the component (B) together with the component (C) in (Step 1).

The amount of the component (A) contained in the masterbatch is, but not particularly limited to, preferably 15 to 65% by mass and more preferably 25 to 55% by mass, from the viewpoint of kneading efficiency. The ratio among the components (A) to (C) in a finally obtained foam is as previously described.

In (Step 2), a foaming agent and, as necessary, a crosslinking agent are added. The type of the foaming agent used for obtaining the foam according to the present invention is not particularly limited. Specifically, physical foaming agents and thermally-decomposable foaming agents are used individually or in combination of two or more. Examples of the physical foaming agent include nitrogen, carbon dioxide, Freon gas, and low-molecular hydrocarbon. On the other hand, examples of the thermally-decomposable foaming agent include nitroso compounds, azo compounds, sulfonyl hydrazide compounds, azide compounds, and inorganic foaming agents. A thermally-decomposable foaming agent is preferable. Specific examples are as previously described.

The foam according to the present invention may be a crosslinked body. The crosslinking method is not particularly limited, and specifically as previously described.

The type of the peroxide, sulfur, and sulfur donors used for crosslinking in the present invention is not particularly limited. One type or a combination of two or more types may be used. Specific examples are as previously described.

The foam according to the present invention and the component (A) as a raw material of the foam may include a stabilizer. Specific examples are as previously described.

The foam according to the present invention may include other additives. Examples of other additives include a foaming aid, an inorganic filler, a pigment, a stabilizer, and a compatibilizer. Specific examples are as previously described.

In (Step 3), the step is not particularly limited, and the foam can be obtained according to a known foam molding method. Examples of the foam molding method includes bead foam molding, batch foam molding, press foam molding, normal-pressure two-stage foam molding, injection foam molding, extrusion foam molding, foam blow molding, core back foam molding, and pressurized foam molding.

Pressurized foam molding is a molding method of charging a molten mixture into a mold heated to a melting point or higher, dissolving a foaming agent and/or a decomposed gas thereof in the mixture under a pressure of, for example, about 10 to 200 MPa, and releasing the pressure to foam the mixture. In all examples of the present invention, foam molding was performed in the following procedure.

(Procedure 1) Charging a molten mixture containing the (A), the (B), the (C), and a foaming agent into a mold heated to 170° C., and leaving the resultant product to stand with a pressure of 35 MPa maintained for 15 minutes.

(Procedure 2) Releasing the pressure and performing cooling to obtain a pressurized foam molded body.

In the production of the foam according to the present invention, the foam was obtained by melting a mixture containing the component (A), the component (B), and the component (C), charging the molten mixture into a mold, and performing pressurized foam molding with a Mini Test Press (manufactured by Toyo Seiki Seisaku-sho, Ltd.). In the production method of the foam according to the present invention, the foam molding temperature is preferably 140 to 200° C., in consideration of the decomposition temperature of a foaming agent, the suppression of deterioration of a fiber, and the like.

The foam according to the present invention can be molded to serve as a molded material and is used for applications which particularly require functions such as weight reduction, heat insulation, sound insulation, insulation, and impact absorption. For example, the foam can be effectively used as a component for transportation machines, electrical appliances, seal and packing materials, printing machines, musical instruments, copying machines, medical products, footwear, sporting goods, construction materials, office supplies, heat insulating materials, sound insulating materials, sundry goods, containers, clothing, and the like.

EXAMPLES

Hereinafter, examples of the present invention will be described. It is noted that the present invention is not limited to these examples.

The evaluation method is as follows.

(1) Confirmation of Progress of Modification Reaction

The progress of a modification reaction was observed using a "Spectrum one" Fourier transform infrared spectrometer manufactured by PerkinElmer Inc. Specifically, the progress of a modification reaction was qualitatively confirmed on the basis of the fact that a peak intensity derived from the stretching vibration of carbonyl carbon and oxygen of an ester bond occurring at 1650 to 1750 $cm^{-1}$ increases with the progress of a modification reaction.

(2) Measurement of Addition Rate of Diene-Based Polymer (a) to Cellulose Fiber

The addition rate was calculated from a mass change of fibers before and after the reaction according to formula (I). For confirming a mass change, the component (A) was washed with tetrahydrofuran, and a mass was measured before and after the washing.

$$Wp=(W-Ws) \times 100/Ws \quad (I)$$

Wp: addition rate (mass %) of diene-based polymer (a) to cellulose fiber
W: dry mass (g) of component (A)
Ws: dry mass (g) of cellulose fiber before reaction (3) Measurement of Solid Content For measuring a solid content, an infrared moisture analyzer (manufactured by Kett Electric Laboratory: "FD-620") was used. The measurement temperature was 150° C.

(4) Measurement of Tensile Modulus

A foam was cut to prepare a test piece of length: 70 mm, width: 10 mm, and thickness: 2 mm. The tensile modulus of the obtained test piece was measured using a "Tensilon RTM-50" tensile testing machine manufactured by Orientec Corporation.

(5) Measurement of Specific Gravity

A mass in air and a mass in water of a foam were measured. The density was obtained by the Archimedes method. The obtained value was divided by the density of water to calculate a specific gravity.

(6) Calculation of Specific Modulus

The tensile modulus obtained in (4) described above was divided by the specific gravity obtained in (5) described above to calculate a specific modulus.

(7) Evaluation of Uniformity

The appearance of a foam was visually confirmed. When three or more fiber aggregates existed per 400 square cm, the uniformity of the foam was evaluated as Poor. Also, the foam was cut, and the cross section was observed. When four or more coarse bubbles having an entire length of 5 mm or more existed per 35 square cm, the foam was evaluated as Poor. When two to three existed, the foam was evaluated as Fair. When one or less existed, the foam was evaluated as Good.

(8) Measurement of Fiber Diameter of Component (A) in Masterbatch

A masterbatch was wrapped in a 325 mesh stainless mesh and treated under reflux of xylene at 140° C. for 5 hours such that resin dissolved. An extracted and dried fiber content was observed through a scanning electron microscope (manufactured by JEOL Ltd., JSM-5610LV) to measure a fiber diameter.

Production Example A-1

[Production of Modified Cellulose Fiber (A-1)]

By mixing 250.0 parts by mass (solid content 50.0 parts by mass) of water-containing needle-leaved tree bleached kraft pulp (hereinafter, described as NBKP) and 200.0 parts by mass of 3-methoxy-N,N-dimethylpropanamide and then distilling water, solvent-substituted NBKP was obtained. The temperature inside the system was set at 80° C., and 25.0 parts by mass of Ricon 130MA8 (manufactured by Cray Valley Co., maleic anhydride-modified polybutadiene, 1,2-addition rate 28%) was poured to be partly covalently bonded with NBKP. The solvent was distilled to obtain a mixture of a modified cellulose fiber (A-1) covalently bonded with a diene-based polymer and an unreacted Ricon 130MA8 as the component (C). The composition ratio of the mixture was (A-1)/(C)=100.0/6.4. The addition rate of the diene-based polymer (a) to the cellulose fiber in the modified cellulose fiber (A-1) was 41% by mass. (The ratio of the added diene-based polymer (a) to 100 parts by mass of the cellulose fiber was 41 parts by mass. The same applies hereinafter.)

Production Example A-2

[Production of Modified Cellulose Fiber (A-2)]

By mixing 250.0 parts by mass (solid content 50.0 parts by mass) of water-containing NBKP and 200.0 parts by mass of 3-methoxy-N,N-dimethylpropanamide and then distilling water, solvent-substituted NBKP was obtained. The temperature inside the system was set at 80° C., and 17.5 parts by mass of POLYVEST (registered trademark (hereinafter, sometimes abbreviated)) MA75 (manufactured by Evonik Industries AG, maleic anhydride-modified polybutadiene, 1,2-addition rate 1%) was poured to be partly covalently bonded with NBKP. The solvent was distilled to obtain a mixture of a modified cellulose fiber (A-2) covalently bonded with a diene-based polymer and an unreacted POLYVEST MA75 as the component (C). The composition ratio of the mixture was (A-2)/(C)=100.0/5.5. The addition rate of the diene-based polymer (a) to the cellulose fiber in the modified cellulose fiber (A-2) was 28% by mass.

Production Example A-3

[Production of Modified Cellulose Fiber (A-3)]
By mixing 250.0 parts by mass (solid content 50.0 parts by mass) of water-containing NBKP and 200.0 parts by mass of 3-methoxy-N,N-dimethylpropanamide and then distilling water, solvent-substituted NBKP was obtained. The temperature inside the system was set at 80° C., and 17.5 parts by mass of BN-1015 (manufactured by SEIKO PMC CORPORATION, maleic anhydride-modified polybutadiene, 1,2-addition rate 85%) was poured to be partly covalently bonded with NBKP. The solvent was distilled to obtain a mixture of a modified cellulose fiber (A-3) covalently bonded with a diene-based polymer and an unreacted BN-1015 as the component (C). The composition ratio of the mixture was (A-3)/(C)=100.0/3.8. The addition rate of the diene-based polymer (a) to the cellulose fiber in the modified cellulose fiber (A-3) was 30% by mass.

Production Example A-4

[Production of Modified Cellulose Fiber (A-4)]
By mixing 250.0 parts by mass (solid content 50.0 parts by mass) of water-containing NBKP and 200.0 parts by mass of 3-methoxy-N,N-dimethylpropanamide and then distilling water, solvent-substituted NBKP was obtained. The temperature inside the system was set at 80° C., and 17.5 parts by mass of Kuraprene (registered trademark (hereinafter, sometimes abbreviated)) LIR-403 (manufactured by Kuraray Co., Ltd., maleic anhydride-modified polyisoprene) was poured to be partly covalently bonded with NBKP. The solvent was distilled to obtain a mixture of a modified cellulose fiber (A-4) covalently bonded with a diene-based polymer and an unreacted Kuraprene LIR-403 as the component (C). The composition ratio of the mixture was (A-4)/(C)=100.0/1.5. The addition rate of the diene-based polymer (a) to the cellulose fiber in the modified cellulose fiber (A-4) was 33% by mass.

Production Example A-5

[Production of Washed Product of Modified Cellulose Fiber (A-1)]
The product of Production Example A-1 was washed with toluene, and the solvent was distilled to obtain a modified cellulose fiber (A-5) as a washed product of the modified cellulose fiber (A-1).

Production Example A-6

[Production of Modified Cellulose Fiber (A-6)]
By mixing 250.0 parts by mass (solid content 50.0 parts by mass) of water-containing NBKP and 200.0 parts by mass of 3-methoxy-N,N-dimethylpropanamide and then distilling water, solvent-substituted NBKP was obtained. The temperature inside the system was set at 80° C., and 817.5 parts by mass of Ricon 130MA was poured to be partly covalently bonded with NBKP. The solvent was distilled to obtain a mixture of a modified cellulose fiber (A-6) covalently bonded with a diene-based polymer and an unreacted Ricon 130MA8 as the component (C). The composition ratio of the mixture was (A-6)/(C)=100.0/5.5. The addition rate of the diene-based polymer (a) to the cellulose fiber in the modified cellulose fiber (A-6) was 28% by mass.

Production Example a-1

[Production of Modified Cellulose Fiber (a-1)]
By mixing 250.0 parts by mass (solid content 50.0 parts by mass) of water-containing NBKP and 200.0 parts by mass of 3-methoxy-N,N-dimethylpropanamide and then distilling water, solvent-substituted NBKP was obtained. The temperature inside the system was set at 80° C., and 10.0 parts by mass of a hexadecenylsuccinic anhydride was poured for reaction to obtain a mixture of a modified cellulose fiber (A-ASA) and a hexadecenylsuccinic anhydride. The composition ratio of the mixture was (A-ASA)/hexadecenylsuccinic anhydride=100.0/7.1.

Production Example a-2

[Production of Modified Cellulose Fiber (a-2)]
There were mixed 120.0 parts by mass of the modified cellulose fiber (a-1), 200.0 parts by mass of 3-methoxy-N,N-dimethylpropanamide, and 10.0 parts by mass of glycidyl methaclate. The mixture reacted at 130° C. for 3 hours. The solvent was distilled to obtain a mixture of a modified cellulose fiber (A-GMA) and a hexadecenylsuccinic anhydride. The amount of the hexadecenylsuccinic anhydride was 6.8% by mass relative to the component (A). The composition ratio of the mixture was (A-GMA)/hexadecenylsuccinic anhydride=100.0/6.8.

Production Example a-3

[Production of Modified Cellulose Fiber (a-3)]
There were mixed 500.0 parts by mass (solid content 80.0 parts by mass) of water-containing NBKP and 0.8 part by mass of ammonium ferrous sulfate monohydrate. To the mixture, there was poured a mixed emulsion of 24.0 parts by mass of glycidyl methacrylate, 1.6 parts by mass of an ADEKA (registered trademark) Pluronic L-44, and 100.0 parts by mass of ion exchanged water. Under nitrogen atmosphere, 2.5 parts by mass of a 34.0% hydrogen peroxide solution and 0.98 part by mass of thiourea dioxide were poured for polymerization at 60° C. for 3 hours. The product was washed with ion exchanged water, tetrahydrofuran, and acetone, and the solvent was distilled to obtain a modified cellulose fiber (A-pGMA) covalently bonded with polyglycidyl methacrylate. A mixture of the modified cellulose fiber (A-pGMA) and polyglycidyl methacrylate was obtained. The composition ratio of the mixture was (A-pGMA)/polyglycidyl methacrylate=100.0/9.3.

Production Example MB-1

[Production of Masterbatch (MB-1)]
A masterbatch (hereinafter, described as an MB) (MB-1) was obtained by pouring an ULTZEX (registered trademark (hereinafter, sometimes abbreviated)) 4020L (manufactured by Prime Polymer Co., Ltd., low-density polyethylene, glass transition point: −123° C.) as the component (B) and the product of Production Example A-1 into a Labo Plastomill (manufactured by Toyo Seiki Seisaku-sho, Ltd., hereinafter, sometimes abbreviated) such that the modified cellulose fiber (A-1) occupied 50% by mass of the entirety, and then melt-kneading the mixture to micronize the modified cellulose fiber (A-1). The fiber diameter of the modified cellulose fiber (A-1) inside the MB-1 was 20 nm to 1.6 μm.

Production Example MB-2

[Production of MB (MB-2)]

An MB (MB-2) was obtained by pouring an ULTZEX 4020L as the component (B) and the product of Production Example A-2 into a Labo Plastomill such that the modified cellulose fiber (A-2) had a content of 30% by mass, and then melt-kneading the mixture to micronize the modified cellulose fiber (A-2). The fiber diameter of the modified cellulose fiber (A-2) inside the MB-2 was 20 nm to 1.5 μm. The fibers inside MBs described later had been also micronized in the same manner.

Production Example B-3

[Production of MB (MB-3)]

An MB (MB-3) was obtained by pouring an ULTZEX 4020L as the component (B) and the product of Production Example A-3 into a Labo Plastomill such that the modified cellulose fiber (A-3) had a content of 30% by mass, and then melt-kneading the mixture to micronize the modified cellulose fiber (A-3).

Production Example MB-4

[Production of MB (MB-4)]

An MB (MB-4) was obtained by pouring an ULTZEX 4020L as the component (B) and the product of Production Example A-4 into a Labo Plastomill such that the modified cellulose fiber (A-4) had a content of 30% by mass, and then melt-kneading the mixture to micronize the modified cellulose fiber (A-4).

Production Example MB-5

[Production of MB (MB-5)]

An n MB (MB-5) was obtained by pouring a Quintone (registered trademark (hereinafter, sometimes abbreviated)) R100 (manufactured by Zeon Corporation, C5-based petroleum resin, glass transition point: 45° C.) as the component (B) and the modified cellulose fiber (A-5) into a Labo Plastomill such that the modified cellulose fiber (A-5) had a content of 30% by mass, and then melt-kneading the mixture to micronize the modified cellulose fiber (A-5).

Production Example MB-6

[Production of MB (MB-6)]

An MB (MB-6) was obtained by pouringan EP24 (manufactured by JSR Corporation, ethylene-propylene-diene copolymer, glass transition point: −48° C.) as the component (B) and the product of Production Example A-6 such that the modified cellulose fiber (A-6) had a content of 30% by mass, and then melt-kneading the mixture to micronize the modified cellulose fiber (A-6).

Production Example mb-1

[Production of MB (b-1)]

An MB (mb-1) was obtained by pouring an ULTZEX 4020L as the component (B) and the product of Production Example a-1 into a Labo Plastomill such that the modified cellulose fiber (A-ASA) had a content of 30% by mass, and then melt-kneading the mixture to micronize the modified cellulose fiber (A-ASA).

Production Example mb-2

[Production of MB (mb-2)]

An MB (mb-2) was obtained by pouring an ULTZEX 4020L as the component (B) and the product of Production Example a-2 into a Labo Plastomill such that the modified cellulose fiber (A-GMA) had a content of 30% by mass, and then melt-kneading the mixture to micronize the modified cellulose fiber (A-GMA).

Production Example mb-3

[Production of MB (mb-3)]

An MB (mb-3) was obtained by pouring an ULTZEX 4020L as the component (B) and the product of Production Example a-2 into a Labo Plastomill such that the modified cellulose fiber (A-pGMA) had a content of 30% by mass, and then melt-kneading the mixture to micronize the modified cellulose fiber (A-pGMA).

Production Example mb-4

[Production of MB (mb-4)]

An MB (mb-4) was obtained by pouring an ULTZEX 4020L as the component (B) and Cellish (registered trademark (hereinafter, sometimes abbreviated) KY100G (manufactured by Daicel FineChem Ltd., micronized cellulose fiber) into a Labo Plastomill such that the cellulose fiber had a content of 30% by mass.

Production Example mb-5

[Production of MB (mb-5)]

An MB (mb-5) was obtained by pouring an Iupilon (registered trademark (hereinafter, sometimes abbreviated)) S-3000 (manufactured by Mitsubishi Engineering-Plastics Corporation, polycarbonate, glass transition point: 150° C.) as a component (B) equivalent and the product of Production Example A-3 into a Labo Plastomill such that the modified cellulose fiber (A-3) had a content of 30% by mass, and then melt-kneading the mixture to micronize the modified cellulose fiber (A-3).

TABLE 1

| MB | Type of component (A) | Content (mass %) of component (A) | Type of contained component (C) | Type of component (B) | Glass transition point (° C.) of component (B) |
|---|---|---|---|---|---|
| MB-1 | A-1 | 50 | Ricon 130MA8 | ULTZEX 4020L | −123 |
| MB-2 | A-2 | 30 | POLYVEST MA75 | ULTZEX 4020L | −123 |

TABLE 1-continued

| MB | Type of component (A) | Content (mass %) of component (A) | Type of contained component (C) | Type of component (B) | Glass transition point (° C.) of component (B) |
|---|---|---|---|---|---|
| MB-3 | A-3 | 30 | BN-1015 | ULTZEX 4020L | −123 |
| MB-4 | A-4 | 30 | Kuraprene LIR-403 | ULTZEX 4020L | −123 |
| MB-5 | A-5 | 30 | — | Quintone R100 | 45 |
| MB-6 | A-6 | 50 | Ricon 130MA8 | EP24 | −48 |
| mb-1 | A-ASA | 30 | — | ULTZEX 4020L | −123 |
| mb-2 | A-GMA | 30 | — | ULTZEX 4020L | −123 |
| mb-3 | A-pGMA | 30 | — | ULTZEX 4020L | −123 |
| mb-4 | (Cellish KY100G) | 30 | — | ULTZEX 4020L | −123 |
| mb-5 | A-3 | 30 | BN-1015 | Iupilon S-3000 | 150 |

Abbreviations in Table 1 are as follows.

Ricon 130MA8: manufactured by Cray Valley Co., maleic anhydride-modified polybutadiene, 1,2-addition rate 28%

POLYVEST MA75: manufactured by Evonik Industries AG, maleic anhydride-modified polybutadiene, 1,2-addition rate 1%

BN-1015 (manufactured by SEIKO PMC CORPORATION, maleic anhydride-modified polybutadiene, 1,2-addition rate 85%

Kuraprene LIR-403: manufactured by Kuraray Co., Ltd., maleinized polyisoprene ULTZEX 4020L: manufactured by Prime Polymer Co., Ltd., low-density polyethylene, glass transition point: −123° C.

Quintone R100: manufactured by Zeon Corporation, C5-based petroleum resin, glass transition point: 45° C.

EP24: manufactured by JSR Corporation, ethylene-propylene-diene copolymer, glass transition point: −48° C.

Cellish KY100G: manufactured by Daicel FineChem Ltd., micronized cellulose fiber Iupilon S-3000: manufactured by Mitsubishi Engineering-Plastics Corporation, polycarbonate, glass transition point: 150° C.

Example 1

Using a roll mill, there were mixed 0.2 part by mass of the MB (MB-1) obtained in Production Example MB-1, 3.0 parts by mass of azodicarbonamide, 3.0 parts by mass of zinc oxide, 1.5 parts by mass of stearic acid, 0.8 part by mass of dicumyl peroxide, and 91.5 parts by mass of ULTZEX 4020L. The mixture was pressurized-foam-molded to obtain a foam containing 0.1% of the modified cellulose fiber (A-1).

Examples 2 to 7

A foam having a composition indicated in Table 2 was obtained in the same manner as in Example 1.

Comparative Example 1

Using a roll mill, there were mixed 3.0 parts by mass of azodicarbonamide, 3.0 parts by mass of zinc oxide, 1.5 parts by mass of stearic acid, 0.8 part by mass of dicumyl peroxide, and 91.7 parts by mass of ULTZEX 4020L. The mixture was pressurized-foam-molded to obtain a foam.

Comparative Examples 2 to 8

A foam having a composition indicated in Table 2 was obtained in the same manner as in Example 1.

TABLE 2

| | Contained MB | Content (mass %) of component (A) | Type of component (B) | Glass transition point (° C.) of component (B) | Mass ratio of components (A)/(B)/(C) | Specific gravity | Specific modulus (MPa) | Uniformity |
|---|---|---|---|---|---|---|---|---|
| Example 1 | MB-1 | 0.1 | ULTZEX 4020L | −123 | 1/915/0.064 | 0.120 | 88 | Good |
| Example 2 | MB-1 | 0.25 | ULTZEX 4020L | −123 | 1/366/0.064 | 0.114 | 91 | Good |
| Example 3 | MB-2 | 3 | ULTZEX 4020L | −123 | 1/29.5/0.055 | 0.105 | 104 | Good |
| Example 4 | MB-3 | 3 | ULTZEX 4020L | −123 | 1/29.5/0.038 | 0.106 | 105 | Good |
| Example 5 | MB-4 | 3 | ULTZEX 4020L | −123 | 1/29.6/0.015 | 0.094 | 96 | Good |
| Example 6 | MB-2 | 12 | ULTZEX 4020L | −123 | 1/6.59/0.055 | 0.095 | 160 | Good |

TABLE 2-continued

| | Contained MB | Content (mass %) of component (A) | Type of component (B) | Glass transition point (° C.) of component (B) | Mass ratio of components (A)/(B)/(C) | Specific gravity | Specific modulus (MPa) | Uniformity |
|---|---|---|---|---|---|---|---|---|
| Example 7 | MB-2 | 18 | ULTZEX 4020L | −123 | 1/4.04/0.055 | 0.131 | 145 | Good |
| Comparative Example 1 | — | 0 | ULTZEX 4020L | −123 | — | 0.095 | 77 | Good |
| Comparative Example 2 | mb-1 | 6 | ULTZEX 4020L | −123 | 1/14.3/0.071 | 0.100 | 73 | Fair |
| Comparative Example 3 | mb-2 | 3 | ULTZEX 4020L | −123 | 1/29.5/0.068 | 0.104 | 81 | Fair |
| Comparative Example 4 | mb-3 | 3 | ULTZEX 4020L | −123 | 1/29.5/0.093 | 0.087 | 60 | Poor |
| Comparative Example 5 | mb-4 | 3 | ULTZEX 4020L | −123 | 1/29.5/0 | 0.106 | 79 | Poor |
| Comparative Example 6 | MB-5 | 3 | ULTZEX 4020L Quintone R100 | −123 45 | 1/29.0/0 | 0.094 | 84 | Good |
| Comparative Example 7 | MB-2 | 22 | ULTZEX 4020L | −123 | 1/3.11/0.055 | — | — | Poor Not molded |
| Comparative Example 8 | mb-5 | 3 | Iupilon S-3000 | 150 | 1/29.5/0.038 | — | — | Poor Not molded |

Example 8

Using a roll mill, there were mixed 15.0 parts by mass of the MB (MB-2) obtained in Production Example MB-2, 3.0 parts by mass of azodicarbonamide, 3.0 parts by mass of zinc oxide, 1.5 parts by mass of stearic acid, and 77.5 parts by mass of INFUSE (registered trademark (hereinafter, sometimes abbreviated)) 9007 (manufactured by The Dow Chemical Company, ethylene-octene copolymer, glass transition point: −62° C.). The mixture was foam molded to obtain a foam containing 4.5% of the modified cellulose fiber (A-2).

Comparative Example 9

Using a roll mill, there were mixed 10.5 parts by mass of ULTZEX 4020L, 3.0 parts by mass of azodicarbonamide, 3.0 parts by mass of zinc oxide, 1.5 parts by mass of stearic acid, and 82.0 parts by mass of INFUSE 9007 (manufactured by The Dow Chemical Company, ethylene-octene copolymer, glass transition point: −62° C.). The mixture was foam molded to obtain a foam containing no modified cellulose fiber.

Example 9

Using a roll mill, there were mixed 10.0 parts by mass of the MB (MB-1) obtained in Production Example MB-1, 10.0 parts by mass of azodicarbonamide, 5.0 parts by mass of zinc oxide, 1.0 part by mass of stearic acid, 1.0 part by mass of dicumyl peroxide, and 100 parts by mass of EP24 (manufactured by JSR Corporation, ethylene-propylene-diene copolymer, glass transition point: −48° C.). The mixture was foam molded to obtain a peroxide crosslinked rubber foam containing 5.0% of the modified cellulose fiber (A-1).

Comparative Example 10

Using a roll mill, there were mixed 5.0 parts by mass of ULTZEX 4020L, 10.0 parts by mass of azodicarbonamide, 5.0 parts by mass of zinc oxide, 1.0 part by mass of stearic acid, 1.0 part by mass of dicumyl peroxide, and 100 parts by mass of EP24. The mixture was foam molded to obtain a peroxide crosslinked rubber foam containing no modified cellulose fiber.

TABLE 3

| | Contained MB | Content (mass %) of component (A) | Type of component (B) | Glass transition point (° C.) of component (B) | Mass ratio of components (A)/(B)/(C) | Specific gravity | Specific modulus (MPa) | Uniformity |
|---|---|---|---|---|---|---|---|---|
| Example 8 | MB-2 | 5 | INFUSE 9007 ULTZEX 4020L | −62 −123 | 1/19.5/0.055 | 0.252 | 16.9 | Good |
| Comparative Example 9 | — | 0 | INFUSE 9007 ULTZEX 4020L | −62 −123 | — | 0.264 | 8.3 | Good |

TABLE 4

| | Contained MB | Content (mass %) of component (A) | Type of component (B) | Glass transition point (° C.) of component (B) | Mass ratio of components (A)/(B)/(C) | Specific gravity | Specific modulus (MPa) | Uniformity |
|---|---|---|---|---|---|---|---|---|
| Example 9 | MB-1 | 5 | EP24 ULTZEX 4020L | −48 −123 | 1/20.0/0.064 | 0.325 | 3.6 | Good |
| Comparative Example 10 | — | 0 | EP24 ULTZEX 4020L | −48 −123 | — | 0.385 | 3.3 | Good |

Example 10

Using a roll mill, there were mixed 10.0 parts by mass of the MB (MB-6) obtained in Production Example MB-6, 10.0 parts by mass of azodicarbonamide, 5.0 parts by mass of zinc oxide, 1.0 part by mass of stearic acid, 1.5 parts by mass of sulfur, 0.5 part by mass of 2-mercaptobenzothiazole, 2.27 parts by mass of tetrabenzylthiuram disulfide, and 95.0 parts by mass of EP24. The mixture was foam molded to obtain a sulfur crosslinked rubber foam containing 5.0% of the modified cellulose fiber (A-6).

Comparative Example 11

Using a roll mill, there were mixed 10.0 parts by mass of azodicarbonamide, 5.0 parts by mass of zinc oxide, 1.0 part by mass of stearic acid, 1.5 parts by mass of sulfur, 0.5 part by mass of 2-mercaptobenzothiazole, 2.27 parts by mass of tetrabenzylthiuram disulfide, and 100.0 parts by mass of EP24. The mixture was foam molded to obtain a sulfur crosslinked rubber foam.

TABLE 5

| | Contained MB | Content (mass %) of component (A) | Type of component (B) | Glass transition point (° C.) of component (B) | Mass ratio of components (A)/(B)/(C) | Specific gravity | Specific modulus (MPa) | Uniformity |
|---|---|---|---|---|---|---|---|---|
| Example 10 | MB-6 | 5 | EP24 | −48 | 1/20.0/0.055 | 0.301 | 3.8 | Good |
| Comparative Example 11 | — | 0 | EP24 | −48 | — | 0.302 | 1.3 | Good |

Example 11

Using a roll mill, there were mixed 10.0 parts by mass of the MB (MB-6) obtained in Production Example MB-6, 10.0 parts by mass of azodicarbonamide, 5.0 parts by mass of zinc oxide, 1.0 part by mass of stearic acid, 1.5 parts by mass of N,N'-diethylthiourea, 4.0 parts by mass of tetrabenzylthiuram disulfide, and 95.0 parts by mass of EP24 (manufactured by JSR Corporation, ethylene-propylene-diene copolymer, glass transition point: −48° C.). The mixture was foam molded to obtain a sulfur crosslinked rubber foam containing 5.0% of the modified cellulose fiber (A-6).

Comparative Example 12

Using a roll mill, there were mixed 10.0 parts by mass of azodicarbonamide, 5.0 parts by mass of zinc oxide, 1.0 part by mass of stearic acid, 1.5 parts by mass of N,N'-diethylthiourea, 4.0 parts by mass of tetrabenzylthiuram disulfide, and 100.0 parts by mass of EP24 (manufactured by JSR Corporation, ethylene-propylene-diene copolymer, glass transition point: −48° C.). The mixture was foam molded to obtain a sulfur crosslinked rubber foam.

TABLE 6

| | Contained MB | Content (mass %) of component (A) | Type of component (B) | Glass transition point (° C.) of component (B) | Mass ratio of components (A)/(B)/(C) | Specific gravity | Specific modulus (MPa) | Uniformity |
|---|---|---|---|---|---|---|---|---|
| Example 11 | MB-6 | 5 | EP24 | −48 | 1/20.0/0.055 | 0.340 | 2.6 | Good |
| Comparative Example 12 | — | 0 | EP24 | −48 | — | 0.332 | 2.2 | Fair |

Example 1, Examples 8 to 11, Comparative Example 1, Comparative Example 5, and Comparative Examples 9 to 12 demonstrate that the use of the micronized product of the component (A) and the diene (C) enables uniform dispersion of the component (A), with the result that the foam is uniform and exhibits an excellent specific modulus.

Comparative Example 8 demonstrates that molding is disabled when the glass transition point of the thermoplastic resin and/or rubber (B) is higher than 120° C.

Example 1 and Comparative Examples 2 to 3 demonstrate that the component (A) exhibits excellent interface compatibility and accordingly dispersibility as well as reinforcing effects.

Example 3 and Comparative Example 4 demonstrate that a modified cellulose fiber covalently bonded with a diene-based polymer exhibits a better specific modulus than a modified cellulose fiber covalently bonded with a non-diene-based polymer.

Examples 1 to 5 demonstrate that the foam exhibits excellent uniformity and specific moduli even when a different type of diene-based polymer is used.

Comparative Example 7 demonstrates that rheology during melting could not be controlled when the added amount of the component (A) was more than 20%, which inhibited foam molding.

The invention claimed is:

1. A foam comprising:
   a modified cellulose fiber (A) in which a cellulose fiber is covalently bonded with a diene-based polymer (a);
   a thermoplastic resin (B); and
   an unreacted diene-based polymer (C) having a functional group capable of covalently bonding with the cellulose fiber, wherein
   the modified cellulose fiber (A) is micronized,
   a content amount of the modified cellulose fiber (A) is 0.05 to 20% by mass with respect to the foam,
   the thermoplastic resin (B) has a glass transition point of −130° C. to 120° C., and
   a mass ratio is (A)/(B)/(C)=1/1.5 to 2000/0.001 to 0.5.

2. The foam according to claim 1, wherein the thermoplastic resin (B) is crosslinked.

3. A production method of a foam, comprising:
   preparing a masterbatch containing:
      a micronized modified cellulose fiber (A) in which a cellulose fiber is covalently bonded with a diene-based polymer (a),
      a first thermoplastic resin (B) having a glass transition point of −130° C. to 120° C., and
      an unreacted diene-based polymer (C) having a functional group capable of covalently bonding with the cellulose fiber;
   diluting the masterbatch with a second thermoplastic resin;
   adding a foaming agent and, as necessary, a crosslinking agent after diluting the masterbatch with the second thermoplastic resin; and
   performing foam molding or crosslinking foam molding after adding the foaming agent and, as necessary, the crosslinking agent.

4. The production method of a foam according to claim 3, wherein the modified cellulose fiber (A) has a content of 0.05 to 20% by mass with respect to the foam, and the foaming agent is thermally-decomposable.

5. The foam according to claim 1, wherein the unreacted diene-based polymer (C) is the same as the diene-based polymer (a).

6. The production method of a foam according to claim 3, wherein the unreacted diene-based polymer (C) is the same as the diene-based polymer (a).

7. The production method of a foam according to claim 3, wherein a mass ratio in the foam is (A)/(a total mass of the first thermoplastic resin and the second thermoplastic resin)/(C)=1/1.5 to 2000/0.001 to 0.5.

* * * * *